United States Patent Office 3,190,742
Patented June 22, 1965

3,190,742
PROCESS FOR PRODUCING A SLOW-ACTING AND QUICK-ACTING NITROGENOUS FERTILIZER MIXTURE CONTAINING CROTYLIDENEDI-UREA
Hans Brandeis, Ludwigshafen (Rhine), Harro Petersen, Mannheim, and Rolf Fikentscher, Ludwigshafen (Rhine), Germany, assignors to Badische Anilin- & Soda-Fabrik Aktiengesellschaft, Ludwigshafen (Rhine), Germany
No Drawing. Filed Sept. 16, 1963, Ser. No. 309,330
Claims priority, application Germany, Sept. 20, 1962, B 68,918
3 Claims. (Cl. 71—28)

This invention relates to a mixture containing crotonylidenediurea. More specifically, it relates to mixtures of crotonylidenediurea with nitrogenous compounds which readily give off nitrogen upon addition of urease.

Crotonylidenediurea is known to be a valuable nitrogen depot fertilizer for agriculture. This compound may be obtained by prior art methods from crotonaldehyde and urea in the presence of hydrochloric acid or from acetaldehyde and urea in strongly acid solution.

Crotonylidenediurea is formed according to the latter method from two moles of acetaldehyde and two moles of urea according to the following reaction equation:

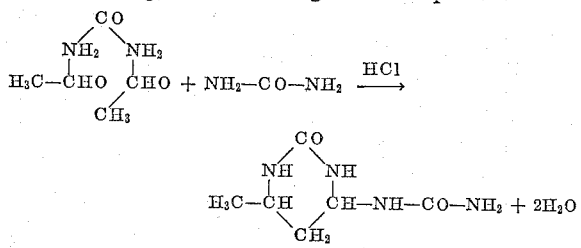

The yield is 70% of the theory.

When crotonylidenediurea is investigated by prior art methods for nitrogen capable of elimination with urease it is found that crotonylidenediurea which has been recrystallized twice from water has a nitrogen content capable of being eliminated with urease of 0% from a cold solution and 0.72% from a hot solution, both percentages being with reference to the total nitrogen. Nitrogen disengageable with urease may be regarded as a measure of readily degradable nitrogen without depot fertilizer action. Thus for example the nitrogen of urea, which has no depot fertilizer action at all, is degraded to the extent of 100% immediately after adding urease.

In practical use in agriculture, however, a certain proportion of readily degradable nitrogen is required in many cases, for example in the cultivation of vines and tobacco, because these plants have an increased need for readily degradable nitrogen constituents at the beginning of their growth period. In order to make nitrogen available to the plants at the beginning of the growth period, nitrogen depot fertilizers of poor solubility, for example crotonylidenediurea, have been mixed with mineral nitrogen fertilizers and marketed. This method has the disadvantage that crotonylidenediurea is formed in a yield of only 70% by synthesis, so that there is a loss of 30%, and that an additional operation is required to mix it with mineral nitrogen fertilizers.

It is an object of the present invention to provide a new mixture containing crotonylidenediurea. Another object of the invention is to provide a mixture containing crotonylididenediurea which may be produced in a yield of 100%. A further object is to provide a mixture containing both slow-acting and quick-acting nitrogenous fertilizer. Another object of the invention is to provide a mixture containing both slow-acting and quick-acting fertilizer and from which approximately equal amounts of nitrogen can be split off with urease from cold and hot solutions. Yet another object is to provide a mixture which is stable in hot water and does not undergo hydrolyzation.

We have found that in the production of crotonylidenediurea from urea and acetaldehyde a high yield of a mixture usable as a nitrogen depot fertilizer is obtained having a content of nitrogen disengageable with urease of from 10 to 50%, preferably 10 to 30%, the amounts of nitrogen disengageable with urease being about the same from cold and hot aqueous solution, if the mixture is produced by reaction of urea and acetaldehyde in the molar ratio 1:1 to 2:1, preferably 1:1 to 1.5:1, in a solution kept at elevated temperature at a pH value which is kept below 3, preferably at 1.5 to 2.5, at least at the end of the reaction, setting up a pH value of between 5 and 9, preferably between 6 and 8, after the reaction, and drying the solid substances formed together with the whole or part of the liquid present in the reaction product.

Drying of the solid substance and mother liquor may be carried out in a conventional way, for example by spraying the liquid containing the reaction product in a spray dryer or by drying on rollers. The content of nitrogen disengageable with urease varies according to the reaction conditions.

It is advantageous to carry out the reaction of urea with acetaldehyde in aqueous solution between 30° and 100° C., preferably between 50° and 80° C., because the reaction proceeds only very slowly at lower temperature and because at higher temperature there is a risk of decomposition of the crotonylidenediurea. The reaction proceeds very rapidly at the higher temperature (100° C.), and at temperatures of 50° to 80° C. the precipitation of the crotonylidenediurea begins after about ten minutes. Long reaction periods are necessary for the most complete reaction possible. The reaction is carried out at a pH value of less than 3, preferably at 1.5 to 2.5. It is possible first to carry out a condensation with the addition of a small amount of acid, i.e., at a pH value of more than 3, and then to complete the condensation at pH values of less than 3. Examples of acids which may be used are hydrochloric acid, sulfuric acid, nitric acid and p-toluenesulfonic acid. It is preferred to use sulfuric acid, for one thing, to avoid corrosion and for another, because sulfuric acid causes less decomposition of crotonylidenediurea at elevated temperature. Condensation of urea with acetaldehyde can be achieved by adding a large amount of acid, if necessary with an increase in the reaction temperature. It is however, possible to carry out the reaction at a high temperature in the presence of less acid. In this case it is necessary to complete the reaction at pH values of less than 3. The sequence in which urea, acetaldehyde and acid are added is not critical. Condensation of urea with acetaldehyde may be carried out in a particularly economical way by a continuous method. By heating the reaction products to an elevated temperature after the reaction it is possible to decrease the content of nitrogen disengageable with urease.

Products prepared according to the process according to this invention do not contain any acetaldehyde in a loosely combined form. They differ in this respect from the products described in German patent specification No. 972,352 because these contain the acetaldehyde probably mainly in the form of polyethylene-ureas, for example (—HNCONH—CH—)$_x$
                    |
                    CH$_3$ which are readily split up by water into urea and acetaldehyde. A condensation product made according to this prior art method has nitrogen contents disengageable with urease of 3.2% from a cold solution and 83.8% from a hot solution. The high value from a hot solution indicates that the acetaldehyde in this condensation product is only loosely combined and can readily be split off hydrolytically. In this way urea is liberated and is decomposed by urease. Acetaldehyde liberated at the same time has a harmful effect on plants.

The invention is further illustrated by the following examples. The parts are parts by weight.

*Example 1*

600 parts of urea is dissolved in 500 parts of water which has previously been mixed with 74.5 parts of sulfuric acid (pH 1.6). 440 parts of acetaldehyde is allowed to flow in while stirring and cooling (molar ratio of urea to acetaldehyde=1:1), the temperature not being allowed to rise above 20° C. The whole is then heated to 40° C. within five minutes, stirred for fifteen minutes at this temperature and heated to 70° C. within five to ten minutes. Crotonylidenediurea begins to separate out shortly after the temperature of 70° C. has been reached. The whole is stirred at 70° C. for thirty minutes, then cooled to 30° C. and stirred for four hours at 30° C. A sample is then withdrawn, neutralized with 20% potassium hydroxide solution and dried over sulfuric acid or phosphorus pentoxide in vacuo at room temperature until it has a constant weight (*a*). The total nitrogen and the nitrogen disengageable with urease from a cold solution and a hot solution, with reference to the total nitrogen, are determined in the sample. A portion of the sample dried at room temperature is heated at 120° C. for two hours (*b*). Finally a sample of the neutralized mash (solid substance and liquid) is dried by heating at 120° C. for two hours (*c*). The nitrogen values are determined in samples (*b*) and (*c*) in the same way as in (*a*).

Further samples are prepared in the same way but using, instead of 440 parts of acetaldehyde, the amounts of acetaldehyde set out in the following table:

| Parts of acetaldehyde: | Molar ratio of urea:acetaldehyde |
|---|---|
| 418 | 1.1:1 |
| 396 | 1.2:1 |
| 374 | 1.3:1 |
| 352 | 1.4:1 |
| 330 | 1.5:1 |
| 275 | 1.75:1 |
| 220 | 2.0:1 |

The analytical values of the various mixtures in whose preparation all the reaction products, i.e., the solid substances and the whole of the liquid, are evaporated and dried and heated, are given in the following table:

| Molar ratio of urea to acetaldehyde | Sample | Percentage of total nitrogen | Percentage of nitrogen disengageable with urease | |
|---|---|---|---|---|
| | | | Cold | Hot |
| 1:1 | a | 28.70 | 11.43 | 16.03 |
| | b | 29.00 | 10.48 | 12.14 |
| | c | 29.20 | 12.06 | 13.56 |
| 1.1:1 | a | 29.12 | 15.80 | 17.86 |
| | b | 29.36 | 13.90 | 16.08 |
| | c | 29.60 | 15.68 | 16.35 |
| 1.2:1 | a | 29.96 | 18.96 | 23.10 |
| | b | 29.88 | 15.93 | 18.07 |
| | c | 29.96 | 17.22 | 19.36 |
| 1.3:1 | a | 30.16 | 21.75 | 25.20 |
| | b | 29.72 | 15.75 | 17.90 |
| | c | 30.64 | 21.02 | 21.93 |
| 1.4:1 | a | 31.04 | 25.26 | 29.00 |
| | b | 30.24 | 19.44 | 21.96 |
| | c | 31.36 | 25.38 | 26.53 |
| 1.5:1 | a | 31.71 | 31.03 | 35.70 |
| | b | 31.58 | 24.07 | 28.88 |
| | c | 31.77 | 28.46 | 30.47 |
| 1.75:1 | a | 33.56 | 40.76 | 46.48 |
| | b | 32.81 | 35.36 | 37.67 |
| | c | 32.81 | 37.31 | 40.23 |
| 2.0:1 | a | 34.88 | 49.66 | 57.46 |
| | b | 34.66 | 48.01 | 49.86 |
| | c | 34.88 | 44.15 | 48.97 |

*Example 2*

A solution of 180 parts of urea in 168 parts of water is introduced into a vessel fitted with a stirrer and with a reflux condenser with cooling brine, acidified with 16.5 parts of 45.6% sulfuric acid and then 132 parts of acetaldehyde is introduced while stirring. The molar ratio of urea to acetaldehyde is 1:1. The acetaldehyde is added within about fifteen minutes, the temperature rising to 70° to 75° C. The reaction temperature of the solution is kept between 70° and 75° C. by constant cooling. Reaction product begins to separate out after a short time. After the mixture has been heated for half an hour at 70° to 75° C. it is cooled to room temperature and stirred at this temperature for another three hours. The whole is then neutralized with 29 parts of 40% potassium hydroxide solution. The mixture is sprayed into a spray tower with an inlet temperature of the air of 400° C. and an outlet temperature of 190° C. A product is obtained having a total nitrogen content of 28.4% of which 14.6% is split off by urease from a cold solution and 16.5% from a hot solution.

*Example 3*

16.5 parts of 45.6% sulfuric acid is added to a solution of 198 parts of urea in 185 parts of water, and then 132 parts of acetaldehyde is added during the course of about fifteen minutes, all in an apparatus as described in Example 2. The molar ratio of urea to acetaldehyde is 1.1:1. The temperature rises to 70° C. during the addition of acetaldehyde. After the whole has been heated at 70° to 75° C. for half an hour, the mixture obtained is cooled to room temperature and stirred for another three hours at room temperature. The whole is then neutralized with 29 parts of 40% potassium hydroxide solution and the mixture sprayed into a spray tower with an inlet temperature of 310° C. and an outlet temperature of 160° C. A product is obtained having a total nitrogen content of 29.4% of which 17.4% is split off by urease from a cold solution and 21.1% from a hot solution.

We claim:
1. A process for producing a slow-acting and quick-acting nitrogenous fertilizer mixture containing crotylidenediurea and other condensation products of urea and acetaldehyde, said process comprising reacting at 30–100° C. urea and acetaldehyde in a molar ratio of urea to acetaldehyde in the range from equal mols up to 2:1, respectively, in water maintained at an acid pH of at least 1.5, maintaining the pH of the reaction mixture at 1.5–3.0 toward the end of the reaction and thereby forming insoluble condensation products of urea and acetaldehyde consisting essentially of crotylidenediurea in a mother liquor, then adjusting the pH of the mother liquor to a value in the range of 5–9, and then drying the insoluble condensation products formed in the reaction together with a sufficient portion of said adjusted mother liquor to produce a fertilizer composition having a nitrogen content disengageable with urease of 10 to 50%, the values for said nitrogen content disengageable with urease from a cold aqueous solution and a hot aqueous solution being about equal.

2. A process as claimed in claim 1 wherein said drying is a spray drying of said insoluble condensation products and said mother liquor.

3. A process as claimed in claim 1 wherein said last-mentioned pH is in the range of 6–8.

References Cited by the Examiner

UNITED STATES PATENTS

| | | | |
|---|---|---|---|
| 2,541,005 | 2/51 | Oldham | 71—28 |
| 2,945,322 | 7/60 | Gaeth et al. | 71—28 |
| 3,054,669 | 9/62 | Jung et al. | 71—28 |
| 3,061,423 | 10/62 | Symes et al. | 71—28 |

DONALL H. SYLVESTER, *Primary Examiner.*

ANTHONY SCIAMANNA, *Examiner.*